Dec. 22, 1925.  
O. P. MAISCH  
TOOL HOLDER  
Filed Jan. 19, 1924

1,566,553

Witnesses:  
Inventor:  
Oliver P. Maisch

Patented Dec. 22, 1925.

1,566,553

UNITED STATES PATENT OFFICE.

OLIVER P. MAISCH, OF CHICAGO, ILLINOIS, ASSIGNOR TO SCULLY JONES AND COMPANY, OF CHICAGO, ILLINOIS, A CORPORATION OF ILLINOIS.

TOOL HOLDER.

Application filed January 19, 1924. Serial No. 687,333.

*To all whom it may concern:*

Be it known that I, OLIVER P. MAISCH, a citizen of the United States, residing at Chicago, in the county of Cook and State of Illinois, have invented a certain new and useful Improvement in Tool Holders, of which the following is a full, clear, concise, and exact description, reference being had to the accompanying drawings forming a part of this specification.

This invention relates to improvements in tool holders, and more particularly to an improved tool holder for mounting reamers, taps and similar tools in spindle lathes, turret lathes, and the like, although the invention is not limited to use with a particular tool, nor with a particular machine, but may be employed wherever found adaptable.

Self-alignment of the work and tool is desirable in many classes of machinery. In lathe work, for example, unequal wear in the centers or in the head and tail stocks results in disalignment of the tool and work as well understood in the art. Slight disalignment may cause very objectionable results because of the great accuracy necessary in various classes of work. Such disalignment is in different directions and of different types. Wear may result in positioning of the tail stock above or below, or in different positions to either side of the axis of the head stock with the axes in parallelism, and angular disalignment may result in one direction, or in a plurality of directions, as where a double or plural angular irregularity occurs, or angular disalignment with the axes in parallel planes may occur together.

The primary object of my present invention is the provision of an improved tool holder which will allow the tool to change its angular position, and which will also permit a floating or sliding movement of the tool out of alignment with the driving axis and in parallelism with said axis. To permit compensation for parallel disalignment in any direction, I provide a holder which permits parallel disalignment of the axis of the tool collet with respect to the axis of the driving shank in a plurality of planes or directions, and to compensate for single angular irregularities in any direction, as well as for any combination of plural angular irregularities, I provide a holder in which angular movement of the tools is permitted in any one or any combination of angular directions by movement about a point center.

To facilitate the self-aligning action of the holder, I provide anti-friction means for minimizing friction to the floating or relative sliding movement, or movement by motion of translation in parallel planes, and the friction to the pivotal action of the holder is also minimized. Means in the form of an adjusting nut binds the parts securely together, and by means of said adjusting nut the pivotal action of the holder may be controlled or adjusted. End play in the device may also be adjusted by this nut to the desired amount for any particular class of work, some work requiring more end play than other work. The adjusting nut is also adapted for locking the holder parts rigidly together where that is desired.

Another object is therefore, the provision of simple and improved means for binding the parts of the holder together and for adjusting the amount of relative movement between the parts and the amount of end play, and for locking the parts against relative movement.

Another object is the provision of a compact device of this sort having a minimum number of parts which may be manufactured and assembled at a minimum cost and which may be conveniently taken apart for cleaning, repair and replacement.

The invention is illustrated in the accompanying drawings in which.

Figure 1:
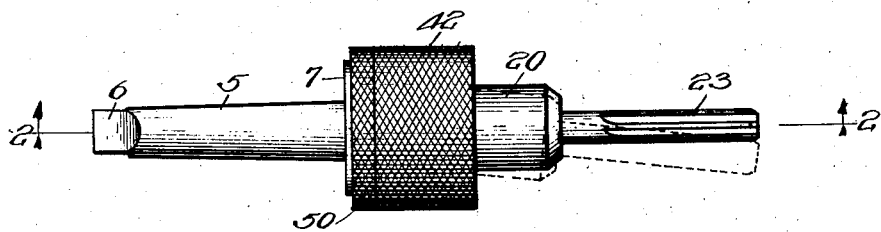
Fig. 1 is a side elevational view of a holder embodying the invention.
Figure 2:
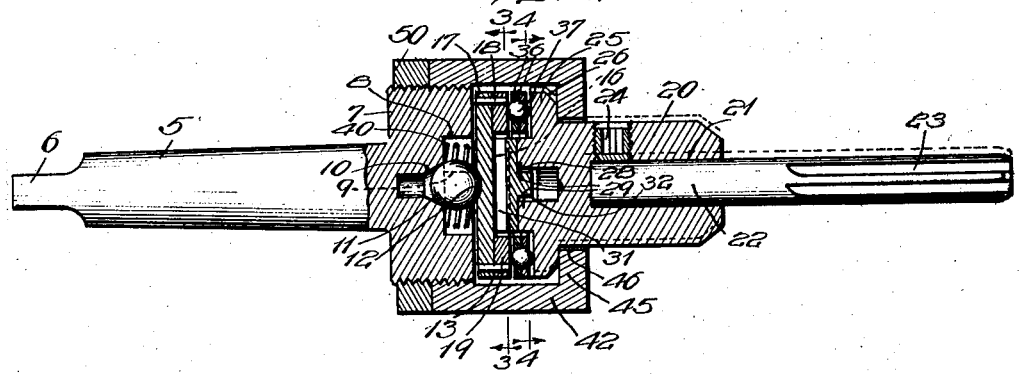
Fig. 2 is an enlarged longitudinal section partially in elevation.
Figure 3:
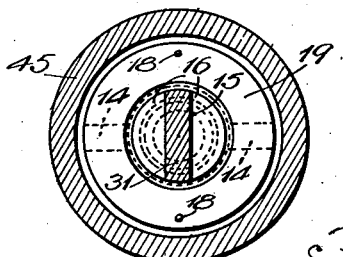
Fig. 3 is a cross section on line 3—3 of Fig. 2.
Figure 4:
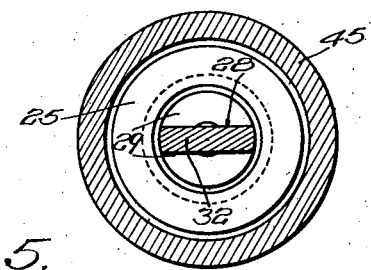
Fig. 4 is a cross section on line 4—4 of Fig. 2.
Figure 5:
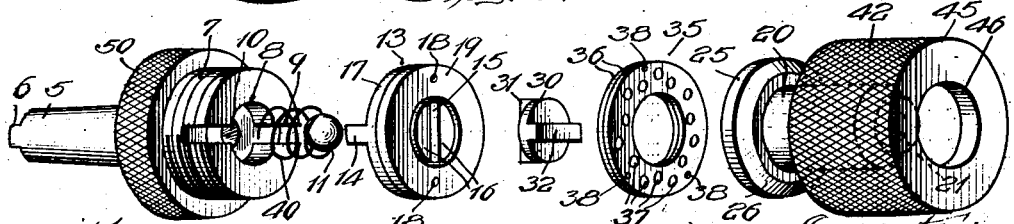
Fig. 5 is an exploded perspective view of the parts of the holder.

Referring to the drawings, the holder has a shank 5 constituting the driving part of the device and adapted to be secured in the turret or tail stock or other tool carrying part of a lathe or other machine with which the holder is to be used. Shank 5 is shown of the standard taper type with the usual flat faced driving or locking end 6. It may be plain or non-tapered or its style and size may be otherwise varied to suit the particular machine with which it is to be used.

The inner end of shank 5 has an integral enlarged head 7, the inner face or end of which is bored centrally at 8 and slotted diametrically at 9. At the axis of shank 5 the bottom of bore 8 has a conical depression 10 and a ball bearing member 11 seats or lies freely in said conical depression 10 and in a relative slight centering depression or recess 12 in the outer face or end of a drive member 13. Drive member 13 comprises the disc which has the centering depression 12, and the outer face of said disc has on opposite sides of said depression a pair of radial driving lugs or tongues 14 which engage in diametrical slot 9 and drivingly connect shank 5 and member 13 for rotation together.

The inner face of member 13 has an axially projecting circular boss provided with a diametrical slot or groove 15 dividing it into two driving lugs or jaws 16. Surrounding jaws 16 and secured to the inner face of disc 17, as by means of projecting pins 18, is an annular bearing ring 19, the inner face of which preferably projects beyond the inner face of lugs 16.

The tool is carried by a collet 20 which constitutes the driven member of the holder. Collet 20 has an axial socket 21 in which the stem or shank 22 of the tool 23 is secured by means of a radial set screw 24. Tool 23 is for purposes of illustration shown as a reamer, but it may be a tap or any other tool with which the holder of my invention is found adaptable for use. The inner end of collet 20 has an integral flange 25 of slightly less diameter than the outside diameter of head 7, and the outer edge of said flange is tapered off or relieved at 26 for a purpose which will hereinafter appear. The inner end of collet 20 has an axially projecting circular boss provided with a diametrical slot 28 dividing it into two driving lugs or jaws 29.

Driving connection is established between driving member 13 and collet 20 by a coupling 30 having projecting from its inner face a diametrical tongue 31 and from its outer face a diametrical tongue 32 disposed at right angles or normal to tongue 31 and engaging in the diametrical slot 28 between the driving lugs 29 at the inner end of collet 20. Tongue 31 projects inwardly and engages in the diametrical slot 15 between the driving lugs 16 on the inner face of drive member 13.

An appropriate ball thrust bearing 35 is arranged between the inner face of ring 19, and the opposing inner annular face of flange 25 and takes up and distributes the end thrust uniformly and minimizes the friction to relative motion of translation between collet 20 and drive member 13. Bearing 35 comprises a pair of annular rings 36 having registering tapered or conical openings arranged over a plurality of circumferentially arranged anti-friction ball members 37, rings 36 being secured together by rivets 38.

Lying in bore 8 and interposed between the inner end of shank 5 and drive member 13 is a coiled spring 40 which maintains the parts all in yielding driving engagement and the parts are all bound together by an adjusting nut 42 which threads upon the external threads on head 7. Nut 42 has at its collet end an inturned flange 45 which cooperates with collet flange 25 and defines an axial opening 46 through which the collet projects. The diameter of opening 46 is larger than the diameter of collet 20, so that there will be a clearance therebetween to permit relative movement between the collet and driving shank. The clearance may be greater than shown, as desired, but ordinarily it need not be great because just a slight clearance will permit considerable angular variation of the cutting end of the tool and slight parallel variation is all that is ordinarily required. The amount of movement may, however, be increased if desired, by increasing the size of opening 46. A lock nut 50 in the form of an angular internally threaded ring threads upon head 7 and cooperates with nut 42 to lock same in any desired position of adjustment, the outer peripheries of nuts 42 and 50 being preferably knurled to facilitate grasping and threading into place or removing.

The cooperating tongue 32 and groove or slot 28 form a driving connection between coupling 30 and collet 20 which permits relative motion of translation between the collet and the driving member in one direction over anti-friction bearings 37, and the cooperating tongue 31 and groove 15 form a driving connection between the coupling and member 13 which permits relative motion of translation between the drive member and the coupling and thereby between the drive member and the collet in a direction normal or at right angles to the permitted motion of translation between the coupling and collect so that the axes of shank or driving member 5 and collet or driven member 20 may be off-set with respect to each other in any desired direction, and into any desired relative position without moving said axes out of parallelism. This permits self adjustment of tool 23 to any disalignment or irregularity in the machine or between the work and tool. As already pointed out, such disalignment as this is not usually great, but is difficult to take up in the machine itself. Relative movement between the shank and collet in parallel planes permits it to be taken up without moving the axes out of parallelism.

Where there is any angular disalignment, pivotal movement of the tool, collet 20, driving member 13, bearing 35 and coupling 30, as a unit about the center of ball member 11, permits self-adjustment of the tool to any such disalignment. It should be noted in this connection that the pivotal action about ball member 11 permits double angular movement of the axis of the tool with respect to the axis of the driving shank, so that the free end of the tool may be swung angularly down in one plane and angularly out in another plane, for example, whereby the tool is self-adjusted to double or plural angular irregularities.

Parallel adjustment or relative movement between the shank and collet in one plane, and relative angular movement in another plane is also permitted, so that any single or combination of irregularities will be compensated for. By means of the adjusting nut 42, I am enabled to lock the shank and collet rigidly together by drawing flange 45 of the nut up securely against the outer face of flange 25, and by unthreading nut 42 from head 7, I am enabled to adjust the amount of angular movement between the shank and collet by adjusting the space between the outer face of flange 25 and flange 45. The tapering off of corners of the flange 25 at 26 removes said corners so as to facilitate angular movement between the parts. The nut 42 also enables me to adjust the end play between the parts. This is important because some work requires more end play in the holder than other work, just as one material requires more or less end play than another material. As nut 42 is unthreaded from head 7, nut 50 is threaded farther onto the head into secure engagement with nut 42, thereby locking nut 42 securely in any adjusted position.

While I have described a specific embodiment of the invention, I believe that my provision of a holder which is self-adjusting to any single or any combination of irregularities is broadly new, and a wide range of modification and changes is contemplated within the spirit and scope of the appended claims.

I claim:—

1. In a tool holder, a driving shank having a head, said head having jaw means and an axial depression at its inner end, a driving member having jaw means for driving engagement with the jaw means on said shank and an axial centering depression, a ball member interposed between the shank and driving member and seated in said depressions, a coupling having driving engagement with and motion of translation relatively to said driving member, a collet having driving engagement with and motion of translation relative said coupling, anti-friction means between the driving member and collet, and an adjusting nut threaded upon the head of the driving shank and having an abutment cooperable with the collet.

2. In a tool holder, a driving shank having a head, said head having jaw means and an axial depression at its inner end, a driving member having jaw means engaging the jaw means on the shank, and an axial centering depression, a ball member interposed between the shank and driving member and seated in said depressions, the driving member having angular motion relative the shank about said ball member, a coiled spring interposed between the shank and driving member, a coupling having driving engagement with the driving member and motion of translation relative thereto, a collet having driving engagement with and motion of translation relative said coupling, antifriction means between the driving member and collet, a flange on the collet, an adjusting nut threaded upon the head of the driving shank and having an inturned flange cooperable with the flange on the collet, the collet having a shank projecting through said nut and provided with a tool socket, and means for locking said nut against displacement.

3. In a tool holder, a driving shank having a threaded head, a circular opening provided in the central portion of said head and an axial centering depression concentric with said opening, a rectangular slot extending diametrically across said head, a driving member having protruding jaw means relatively rectangular in form for engaging with the slot in said head, a ball member seated in said axial centering depression and abutting said driving member and a coil spring seated in said circular opening, a coupling having protruding jaws on opposite sides thereof and relatively normal to each other, a collet, said driving member and collet having driving engagement with and motion of translation relative said coupling, a ball bearing member interposed between the driving member and collet, and means for adjusting said collet relative said threaded head.

In witness whereof, I hereunto subscribe my name this 16th day of January, 1924.

OLIVER P. MAISCH.